Patented Dec. 12, 1939

2,183,503

UNITED STATES PATENT OFFICE 2,183,503

POLYMERIZATION OF OLEFINS

Ambrose McAlevy, Wilmington, Del., assignor to E. I. du Pont de Nemours & Company, Wilmington, Del., a corporation of Delaware No Drawing. Application January 25, 1938, Serial No. 186,813

12 Claims. (Cl. 196—10)

This invention relates to an improved process of manufacturing liquid hydrocarbons from unsaturated hydrocarbons. More specifically, it relates to improvements in the process of catalytic polymerization of unsaturated hydrocarbons of the ethylene series to yield gasoline-like liquid hydrocarbons, wherein a catalyst containing boron fluoride and water is employed.

Numerous natural products and products resulting from technical processes contain olefins in various proportions. These products are limited in their use because of their contained unsaturated constituents. Various methods have been proposed to separate these unsaturates. These proposed methods suffer from technical and commercial disadvantages, since, in some of them, the aliphatic constituents are resinified or converted into tar, while, in others, the difficulty of recovering the polymeric products is uneconomical.

An object of the present invention is to provide an improved process for the polymerization of olefins to gasoline-like liquid hydrocarbons, which eliminates many of the aforementioned difficulties. Another object of the invention is to provide a process for the polymerization of olefins which can be modified to the particular type of olefin or mixture of olefins to be polymerized. Yet another object of the invention is to provide a new type of catalyst for olefin polymerization reactions consisting of boron fluoride and water, the amount of water used in this two-component catalyst varying in accord with the type of gaseous mixture and olefins being polymerized, the product desired, as well as the temperature, pressure and time of the reaction. Another object of the invention is to provide a process for the reconcentration of the catalyst during or subsequent to its use. Other objects and advantages of the invention will hereinafter appear.

I have found that olefin-containing gases such, for example, as "receiver gas" from the liquid phase cracking of petroleum crude, "stabilizer gas" obtained from fractionating columns used in the stabilization of gasoline produced by vapor phase cracking, "stabilizing reflux" obtained from the latter source, and olefin-containing natural and artificial products, generally, can be readily converted to valuable gasoline-like products by polymerization in the presence of a catalyst containing boron fluoride and water. While it is generally known that anhydrous boron fluoride will effect polymerization of olefins, there is no appreciation of the fact that this gas can be admixed with water in various proportions and by this method a catalyst prepared which has the extensive range of catalytic activity from the powerful polymerization activity of boron trifluoride containing but a small amount of water to a mildly or weakly catalytic mixture containing a large amount of water and a small amount of boron trifluoride.

Generally, the catalyst is preferably used in the liquid phase. A catalyst, for example, containing 1 part of boron trifluoride dissolved in 3 parts of water is placed in a suitable converter, the olefin-containing gas is bubbled through the liquid catalyst at proper temperature and pressure. The unconverted olefins and saturated gases are vented, while the polymeric products may be readily separated from the aqueous boron fluoride catalyst by simple decantation and/or distillation. The reaction can be carried out in a continuous manner, if desired, by continuously feeding in catalyst and unsaturated gases while simultaneously removing the products and recirculating unreacted materials.

My preferred polymerization catalyst for these reactions constitutes a mixture of boron fluoride and water in the ratio ranging between 1 and 5 mols of water per mol of boron trifluoride and preferably from 2.2 mols to 5 mols of water per mol of boron trifluoride. While the prior art indicates that compounds exist containing definite specified proportions of water and boron trifluoride, I have found that, generally speaking, a catalyst containing substantially any proportion of water and the fluoride between the proportions given can be prepared. Usually I prefer to make my catalyst by the simple interaction of 3 mols of liquid anhydrous hydrofluoric acid with 1 mol of solid orthoboric acid. This gives a liquid containing substantially 3 mols of water per mol of boron trifluoride, which catalyst is especially well adapted for carrying out the polymerization of olefins in accord with my process at the higher temperatures. With low water to boron fluoride ratios, polymerization may be effected at low temperatures without substantial hydration of the olefin to the corresponding alcohols or addition products thereof, while with higher water to boron fluoride ratios much higher temperatures should usually be employed if the inhibition of hydration is desired. Moreover, it is commercially advantageous to carry out polymerizations at rapid rates, which are induced by high temperatures, with proper control of the direction of the reaction at the higher rates. My invention, with its provision for effecting the polymerization with high water to boron fluoride ratios, makes such operation possible and practicable.

Not only can the olefin-containing gases obtained by the cracking of petroleum oils be condensed by my improved catalyst but, likewise, olefin-containing products produced in the cracking of paraffins, benzenes and tar oils may be similarly treated to polymerize their olefin content. Furthermore, the olefins contained in mixtures of gases resulting from tar distillates, hydrogenation of coal, carbonization of wood, low-temperature carbonization of coal, and also the product obtained by the cracking of coal, may be polymerized with advantage by the use of my preferred boron trifluoride-water mixtures.

One of the outstanding advantages of using liquid boron fluoride-water catalysts is that the polymeric products of the reaction rapidly separate from the aqueous catalyst. Moreover, the nature of the catalyst is such that it can be readily and efficiently reconcentrated to the desired water and boron fluoride composition by the differential pressure distillation processes and calcium fluoride separation processes disclosed in copending applications Serial Nos. 105,154 (Patent No. 2,160,576, granted May 30, 1939) and 94,337, (Patent No. 2,135,460, granted November 1, 1938) respectively.

The more detailed practice of the invention is illustrated by the following examples, in which parts are given by weight unless otherwise stated. There are, of course, many forms of the invention other than these specific embodiments.

Example 1

1696 parts of solid orthoboric acid are placed in a suitable pressure-sustaining receptacle and 1643 parts of liquid anhydrous hydrofluoric acid are added. The temperature of the exothermic reaction is kept at approximately 10° C. and when the reaction of the hydrofluoric acid with the boric acid is complete a liquid, fairly mobile mixture containing substantially 1 mol of boron trifluoride to 3 mols of water and having a specific gravity of 1.5 to 20° C. is obtained.

Example 2

A rectifying column capable of withstanding moderate pressures is charged as needed with the liquid catalyst prepared in accord with Example 1. An olefin-containing gas such, for example, as "stabilizer gas" containing approximately 39% propylene-butylenes, 3% butadiene and 20% lower olefins is continuously bubbled up the column, under a pressure of approximately 250 pounds per square inch. The temperature of the center of the column is maintained between approximately 100 and 150° C., while the polymeric product and catalyst is continuously removed from the bottom of the column, the unpolymerized and low-boiling polymeric products being distilled off the top. The catalyst being separated by distillation is returned to the column.

Example 3

Ethylene gas is polymerized by being bubbled into an aqueous liquid containing one mol of boron trifluoride and 2.5 mols of water. During the addition the temperature is maintained at between 150 and 200° C. and a pressure at from 1 to 100 atmospheres.

Example 4

A silver-lined pressure-resisting shaker tube is charged with a mixture containing 1 part of isobutylene and 3 parts of normal butylene, together with a boron fluoride-water mixture having a ratio of 1 to 1.45. The temperature is maintained at approximately −10° C. Samples of the product are removed from the tube periodically, without stopping the reaction, over a period of 5 hours, and it is found that the polymeric product which initially appears as a light liquid becomes more and more viscous, indicating that polymers of greater molecular weight are obtained, the greater the duration of polymerization.

Example 5

173 parts, by weight, of a mixture of boron fluoride and water containing, on a molal basis, 1 mol of boron fluoride to 2.5 mols of water were mixed with 129 parts of tertiary butanol. The resulting mixture was stirred for 2½ hours at a temperature between 50 and 70° C. The separated upper layer was dried and distilled to give 80 parts of a final product which contained diisobutylene and triisobutylene, the latter boiling at a temperature between 180 and 181° C.

For low temperature polymerization I have found that the boron fluoride-water ratio of Example 4 may be used down to temperatures of from −15 to −20° C., while, if lower temperatures, say, down to −78° C. are used, dihydrofluoboric acid should be employed as its melting point is −78° C.

As I have indicated it is possible to control the catalytic activity of my two-component catalyst by varying the ratio of water to boron trifluoride. If it be desired, from the standpoint of catalyst activity, to carry out the polymerization at low temperatures, say, down to 5–10° C., the ratio of boron trifluoride to water should be relatively high, say, from 1.5 to 1.9 $BF_3$ per 1 $H_2O$. By raising the water content of the catalyst and increasing the temperature of the reaction, substantially the same rate of polymerization results. For example, with a ratio of boron fluoride-water of 1 to 3, the temperature of polymerization may be carried out in the neighborhood of 100–200° C. While, if the ratio be even greater, that is, in the order of 4 mols of water per mol of boron fluoride, or higher, temperatures between 150 and 325° C. and higher may be employed.

Along with the formation of polymeric products there is a tendency to form alcohols by hydration of the olefins if the temperature be too low, as compared to the ratio of boron fluoride to water, and, under these circumstances, if it be desired to lower the alcohol content of the product, it is advisable either to decrease the concentration of water or increase the temperature and/or pressure of the reaction.

I have indicated that super atmospheric pressures are desirable and particularly pressures in the order of 5 atmospheres or higher, although pressures may be increased to from 400 to 700 atmospheres or higher to increase the velocity of the reaction. When excessively high pressures and temperatures are employed, however, it is advisable to decrease the time of contact between the olefins and the boron fluoride-water catalyst, for polymerization will proceed so rapidly under these circumstances that, in many instances, unless time of contact is short, high-boiling liquids and tars constitute the product.

From a consideration of the above specification, it will be appreciated that many changes may be made in the details therein given without departing from the scope of the invention or sacrificing any of the advantages that may be derived therefrom.

I claim:

1. A process for the polymerization of olefins which comprises contacting the olefins at a temperature from minus 78° C. to 325° C. and a pressure of from 5 to 700 atmospheres, with a liquid catalyst of boron fluoride and water, the boron fluoride and water being present in the ratio of 1 mol of boron fluoride to from 2.2 to 5 mols of water.

2. A process for the polymerization of an olefin which comprises contacting the olefin at a temperature between 100–325° C. and a pressure of from 5 to 700 atmospheres, with a liquid catalyst of boron fluoride and water, the boron fluoride and water being present in the ratio of 1 mol of boron fluoride to 2.2 to 5 mols of water.

3. A process for the polymerization of normally gaseous olefins which comprises contacting the olefins at a temperature of from 100–175° C. and a pressure of from 5 to 700 atmospheres, with a liquid catalyst of boron fluoride and water, in the ratio of 1 mol of boron fluoride to 3 mols of water.

4. A process of controling the polymerization or normally gaseous olefins which comprises converting the olefins to gasoline-like liquids by contacting the olefins with a liquid water-boron fluoride catalyst having a ratio of water to boron fluoride of from 3 to 5 mols of water per mol of boron fluoride, under a pressure in excess of 5 atmospheres and a temperature from 100° C. to 200° C., whereby substantially no olefins are hydrated to alcohols.

5. A process for controlling the polymerization of normally gaseous olefins which comprises converting olefins to gasoline-like liquids, substantially free from alcohols and ethers, by contacting the olefins, at a temperature from 100° C. to 200° C. and at a pressure of from 5 to 700 atmospheres, with a liquid catalyst containing boron fluoride and water, the ratio of water to boron fluoride ranging from 1 to 5 mols of water per mol of boron fluoride, the production of alcohols and ethers when they appear in the products of the reaction being inhibited by decreasing the water to boron fluoride ratio.

6. A process for controlling the polymerization of normally gaseous olefins which comprises converting olefins to gasoline-like liquids, substantially free from alcohols and ethers, by contacting the olefins at a temperature from 100° C. to 200° C. and at a pressure of from 5 to 700 atmospheres, with a liquid catalyst containing boron fluoride and water, the ratio of water to boron fluoride ranging from 1 to 5 mols of water per mol of boron fluoride, the production of alcohols and ethers when they appear in the products of the reaction being inhibited by increasing the temperature.

7. A process for the continuous polymerization of olefin-containing gases resulting from the cracking of hydrocarbon oils which comprises continuously bubbling an olefin-containing gas into a reaction chamber containing a liquid catalyst consisting of water and boron trifluoride, the ratio of water to boron trifluoride ranging from 1 to 5 mols of water per mol of boron trifluoride and continuously removing from said converter the polymeric compounds produced.

8. A process of polymerizing olefins which comprises contacting the olefin with a catalyst which is in the liquid phase, the catalyst comprising essentially boron fluoride and water in the ratio of from 1 mol of boron fluoride to 2.2 to 5 mols of water.

9. The process of claim 8 wherein the production of alcohols and ethers is inhibited by increasing the temperature of the reaction when they begin to appear.

10. A process for the polymerization of ethylene which comprises contacting the ethylene at a temperature from −78° C. to 325° C. and a pressure of from 5 to 700 atmospheres, with a liquid catalyst of boron fluoride and water, the boron fluoride and water being present in the ratio of 1 mol of boron fluoride to from 2.2 to 5 mols of water.

11. A process for the polymerization of propylene which comprises contacting the propylene at a temperature from −78° C. to 325° C. and a pressure of from 5 to 700 atmospheres, with a liquid catalyst of boron fluoride and water, the boron fluoride and water being present in the ratio of 1 mol of boron fluoride to from 2.2 to 5 mols of water.

12. A process for the polymerization of isobutylene which comprises contacting the isobutylene at a temperature from −78° C. to 325° C. and a pressure of from 5 to 700 atmospheres, with a liquid catalyst of boron fluoride and water, the boron fluoride and water being present in the ratio of 1 mol of boron fluoride to from 2.2 to 5 mols of water.

AMBROSE McALEVY.